(12) United States Patent
Belknap

(10) Patent No.: US 7,751,683 B1
(45) Date of Patent: Jul. 6, 2010

(54) SCENE CHANGE MARKING FOR THUMBNAIL EXTRACTION

(75) Inventor: William R. Belknap, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1604 days.

(21) Appl. No.: 09/709,095

(22) Filed: Nov. 10, 2000

(51) Int. Cl.
*H04N 5/93* (2006.01)
*H04N 5/91* (2006.01)
*H04N 5/14* (2006.01)

(52) U.S. Cl. .............................. 386/52; 386/69; 386/95; 348/700

(58) Field of Classification Search ................... 386/95, 386/52, 55, 69, 70, 109, 110, 111; 348/700–701, 348/415.1, 416.1; 375/240.26
See application file for complete search history.

(56) References Cited

U.S. PATENT DOCUMENTS

| | | | | |
|---|---|---|---|---|
| 5,231,484 A | | 7/1993 | Gonzales et al. ............. 358/133 |
| 5,267,034 A | * | 11/1993 | Miyatake et al. ........ 348/208.99 |
| 5,485,553 A | * | 1/1996 | Kovalick et al. .............. 386/65 |
| 5,489,943 A | | 2/1996 | Kutner ........................ 348/405 |
| 5,537,528 A | * | 7/1996 | Takahashi et al. ........... 715/512 |
| 5,576,765 A | | 11/1996 | Cheney et al. .............. 348/407 |
| 5,614,960 A | | 3/1997 | Chiba et al. ................. 348/700 |
| 5,627,765 A | | 5/1997 | Robotham et al. .......... 364/514 |
| 6,005,643 A | * | 12/1999 | Morimoto et al. ....... 375/240.26 |
| 6,411,771 B1 | * | 6/2002 | Aotake ........................ 386/52 |
| 6,480,669 B1 | * | 11/2002 | Tsumagari et al. ............. 386/95 |
| 6,571,054 B1 | * | 5/2003 | Tonomura et al. ............. 386/95 |
| 6,748,158 B1 | * | 6/2004 | Jasinschi et al. .............. 386/69 |

FOREIGN PATENT DOCUMENTS

JP          09065287 A          3/1997

OTHER PUBLICATIONS

Deguillaume, F. et al., "Robust 3D DFT video watermarking", Proceedings of the SPIE—The International Society for Optical Engineering, vol. 3657, pp. 113-124, 1999. Abstract.
Chiruvolu, G. et al., "A scene-based generalized Markov chain model for VBR video traffic", ICC '98, 1998 IEEE International Conference on Communications. Conference Record. Affiliated with SUPERCOMM '98 (Cat. No. 98CH36220), Pt. vol. 1, pp. 554-558 vol. 1, Published: NewYork, NY, USA, 1998, 3 vol. Xxxvii+1838 pp.

(Continued)

*Primary Examiner*—Vincent Boccio
(74) *Attorney, Agent, or Firm*—Gates & Cooper LLP

(57) ABSTRACT

A technique for marking scene changes within video files. A video file with multiple frames is stored on a data store connected to a computer. Initially, the video file is received by an encoder or other processor. The frames of the video file are analyzed to identify scene changes between frames. Each frame of the video file includes a field that is marked with scene change data. Within the encoder, fields of frames are marked to represent scene changes.

51 Claims, 6 Drawing Sheets

OTHER PUBLICATIONS

Yoo, S.J. et al., "Scene-based traffic modelling and queueing analysis of MPEG video sequences", Electronic Letters, vol. 34, No. 15, pp. 1484-1486, Jul. 23, 1998.

Agrawal, S.K. et al., "Characterization, adaptive traffic shaping and multiplexing of real-time MPEG-II video", Proceedings of the SPIE—The International Society for Optical Engineering, vol. 2915, pp. 51-63, 1997.

"A Robust Scene Cut Detection and Reaction Apparatus for MPEG Video Encoding", Disclosed by International Business Machines Corporation, 41858.

"Adaptive Scene Change Detection", IBM Technical Disclosure Bulletin, vol. 39, No. 04, pp. 43-44, Apr. 1996.

"User Guided Selection or Elimination of Identified Information in Video Sequence", IBM technical Disclosure Bulletin, vol. 39, No. 8, Aug. 1996, pp. 141-146.

* cited by examiner

SCENE CHANGE MARKING FOR THUMBNAIL EXTRACTION

BACKGROUND OF THE INVENTION

1. Field of the Invention

This invention relates in general to video transmission systems performed by computers, and in particular, to marking scene changes in video streams.

2. Description of Related Art

Various applications process video streams or video feeds which are presented to users for different applications. For example, a newsroom may receive video streams from a satellite or other transmission device relating to a recent news event or an Internet user may request a video stream or story board of a sports event. These video streams or files must be processed and presented to the user as quickly as possible since they relate to recent news events and/or must be transmitted over a network quickly to minimize the waiting time assumed by the user.

Before the video stream or file can be presented to a user, however, the video streams are processed such that certain frames that represent the most relevant information of the video stream are selected. These frames are often coined "scene change" frames as compared to other frames which may portray negligible content differences from previous frames. In this context, a scene change occurs when the content of a first frame of the video stream changes sufficiently in a second frame of the video stream such that the second frame triggers a new view relative to the first frame. In order to generate the requested video streams or files, the video streams are processed and analyzed to identify and select scene change frames such that the frames ultimately presented to the user contain the most relevant information.

Examples of applications using scene change analysis to select frames include newsroom videos and Internet files. In the context of newsrooms or news editors and producers, video streams relating to recent news stories may be received from a satellite, a live feed, or a video tape in analog or digital video format. These video streams are analyzed to identify the scene change frames, and these frames are selected and compiled into, for example, a video clip. As these streams may relate to recent news items, this processing and selection must be completed as quickly as possible to insure that the resulting video file is played when the news story is still significant.

Similarly, in the context of the Internet, users may request video files or a storyboard which invokes an extraction tool to select frames of a video file. A storyboard is a collection of images or a collection of thumbnails (i.e., smaller images representing scenes from a video file). An extraction tool, such as a thumbnail extraction tool, may be used to create the storyboard.

More specifically, the Internet is a collection of computer networks that exchanges information via Transmission Control Protocol/Internet Protocol ("TCP/IP"). The Internet computer network consists of many Internet networks, each of which is a single network that uses the TCP/IP protocol. Via its networks, the Internet computer network enables many users in different locations to access information (e.g., video streams) stored in data sources in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a Database Management System ("DBMS"), which is connected to the data sources. These computer programs residing at the Web server computer will retrieve and transmit the data, including video data, to the client computer. Many video streams are transformed into video files that follow digital video compression standards and file formats developed by the Motion Pictures Experts Group (MPEG). These are referred to as MPEG files and are typically files corresponding to movies. Furthermore, there are various video file formats, including MPEG-1, MPEG-2, and MPEG-4 which produce video files at different resolutions.

Some users request storyboards that are comprised of frames of a video file. When a storyboard is to be generated from a video stream or video clip, an application calls a thumbnail extraction tool to conduct scene change analysis and determine which frames of an MPEG file should be selected as part of the storyboard, i.e., which frames were selected from a video stream as scene change frames. Scene change analysis in this context involves comparing a first frame of an MPEG file to a second frame of the MPEG file, etc. for each pair of frames. Frames representing scene changes are selected by the thumbnail extraction tool based on different factors (e.g., the degree of pan, scan, zoom, etc.) and these selected video stream frames are compiled into a video file. Each of these frames may be an image or "thumbnail" in the storyboard. An MPEG file may include thousands or tens of thousands of frames. Since the storyboard frames must be selected and presented quickly such that the user can select the frames shortly after choosing to generate a storyboard, the analysis and selection of the frames to include within the storyboard must be done as quickly as possible.

Thus, it is clear that video streams must be processed as quickly as possible whether the video stream will ultimately become a news clip, part of an MPEG file or storyboard, or used within some other application or file. In processing video streams or video files, conventional systems process frames twice to determine which frames of the video stream to include within a particular video file. First, when the video stream is initially encoded, frames are processed, for example, to add closed captioning. Second, when an application requests, for example, a storyboard, an extraction tool processes the frames to determine which frames will be selected to create the storyboard. The extra time required to process the frames a second time is assumed by the user. The problem is even more troublesome when there are multiple requests for a video file to create different storyboards. For example, if five different applications request storyboards based on different criteria, a thumbnail extraction tool must perforin the scene change analysis five separate times to determine which frames to include within the storyboard for each application.

As illustrated by these simple examples, conventional systems do not access scene change data in real time or near real time, and thus, are inefficient. Consequently, the cost to process video streams is substantially increased. These shortcomings are amplified when scene change analysis is performed manually or by a slower, more complicated system. In addition, if a system is configured to recognize finer changes between scenes, substantially more time may be required to perform the scene change analysis since these more detailed analyses may involve more complicated calculations.

Thus, there is a need in the art providing scene change analysis to extraction tools in real time or near real time for different video stream applications.

SUMMARY OF THE INVENTION

To overcome the limitations in the prior art described above, and to overcome other limitations that will become apparent upon reading and understanding the present specification, the present invention discloses a method, apparatus, and article of manufacture for marking scene change data.

According to an embodiment of the invention, a video stream with multiple frames is received by a computer. The frames of the video stream are analyzed to identify scene changes between the frames. Each frame of the video stream includes a field that can be marked with scene change data. The fields of the frames of the video stream representing scene changes are marked.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Scene Change Marking for Thumbnail Extraction

Figure 1:
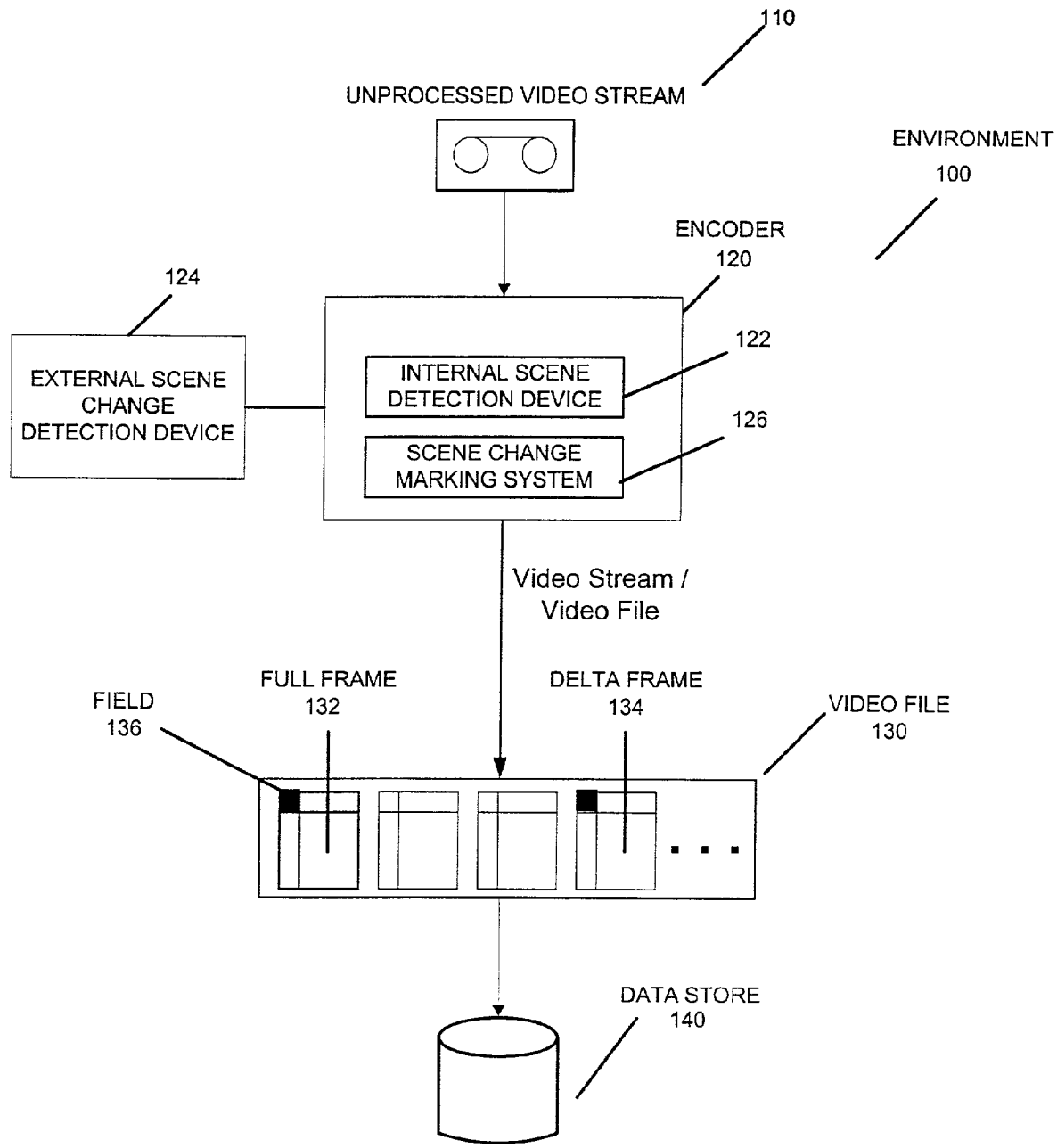
FIG. 1 schematically illustrates an environment in which the scene change marking system may execute.

Referring to FIG. 1, an illustration of an environment 100 in which one embodiment of the present invention may be used, initially, a video stream or video feed 110 including multiple frames is received from a satellite transmission, a live feed, a video tape, or other source in analog or digital format. The unprocessed, video stream 110 is read into an encoder 120. Alternatively, the video stream 110 may be read into a file or other storage device and then read into an encoder 120. The encoder 120 receives the video stream 110 and analyzes each frame to determine which frame or frames represent a scene change by using an internal 122 or external 124 scene change detection device. The scene change marking system 126, associated with the scene change marking devices 122 and 124, marks one or more fields (e.g., data fields) of one or more frames identified by the scene change detection devices 122 and 124. After the scene change analysis is performed, the encoder 120 outputs either a different video stream or a video file 130. The scene change analysis may be performed within the encoder before, during, or after other processing tasks, for example, compression.

The video file 130 may be compressed into, for example, a Motion Pictures Experts Group (MPEG) format, while retaining the frames with marked fields (e.g., data fields) representing scene changes. Thus, the video file 130 may include full frames 132 and "delta" frames 134. A delta frame 134 includes a portion of a full frame 132. For purposes of illustration, in FIG. 1, a full frame 132 is illustrated as a shaded frame, whereas a delta frame 134 is illustrated as a non-shaded frame. The frames of the video stream 110 may include a field 136. The field 136 may be a user data field. In an alternative embodiment of the present invention, the field 136 may be a private data field. The following description refers to user data fields, although private data fields or other fields could also be utilized. Thus, for one embodiment of the invention, each full frame 132 and each delta frame 134 includes user data fields 136.

Typically, there are multiple user data fields 136, and these user data fields 136 are used for various purposes. For example, conventional systems use the user data field to store closed captioning information. In addition to this data, the scene change marking system 126 can also utilize the user data field 136 to update frames which represent scene changes with scene change data. For purposes of illustration, an updated user data field 136 is indicated with a dark box in the upper left corner of each frame. The video file 130, which may include scene change frames with marked user data fields 136 may be stored in data store 140. An extraction tool invoked by an application may then access the processed video file 130 stored in data store 140 to create a storyboard. In particular, the extraction tool selects frames from the processed video file 130 by referring to the scene change data marked in the user data field 136 of each frame.

Those skilled in the art will recognize that the exemplary environment illustrated in FIG. 1 is not intended to limit the present invention. Indeed, those skilled in the art will recognized that other alternative system environments may be used without departing from the scope of the present invention. For example, in one embodiment, the scene change marking system 126 is part of an encoder 120. However, other alternative embodiments may be configured such that the scene change marking system 126 is independent of the encoder but still associated with the encoder or such that the scene change marking system includes all of the components of FIG. 1 and coordinates the activities of each component.

Figure 2:
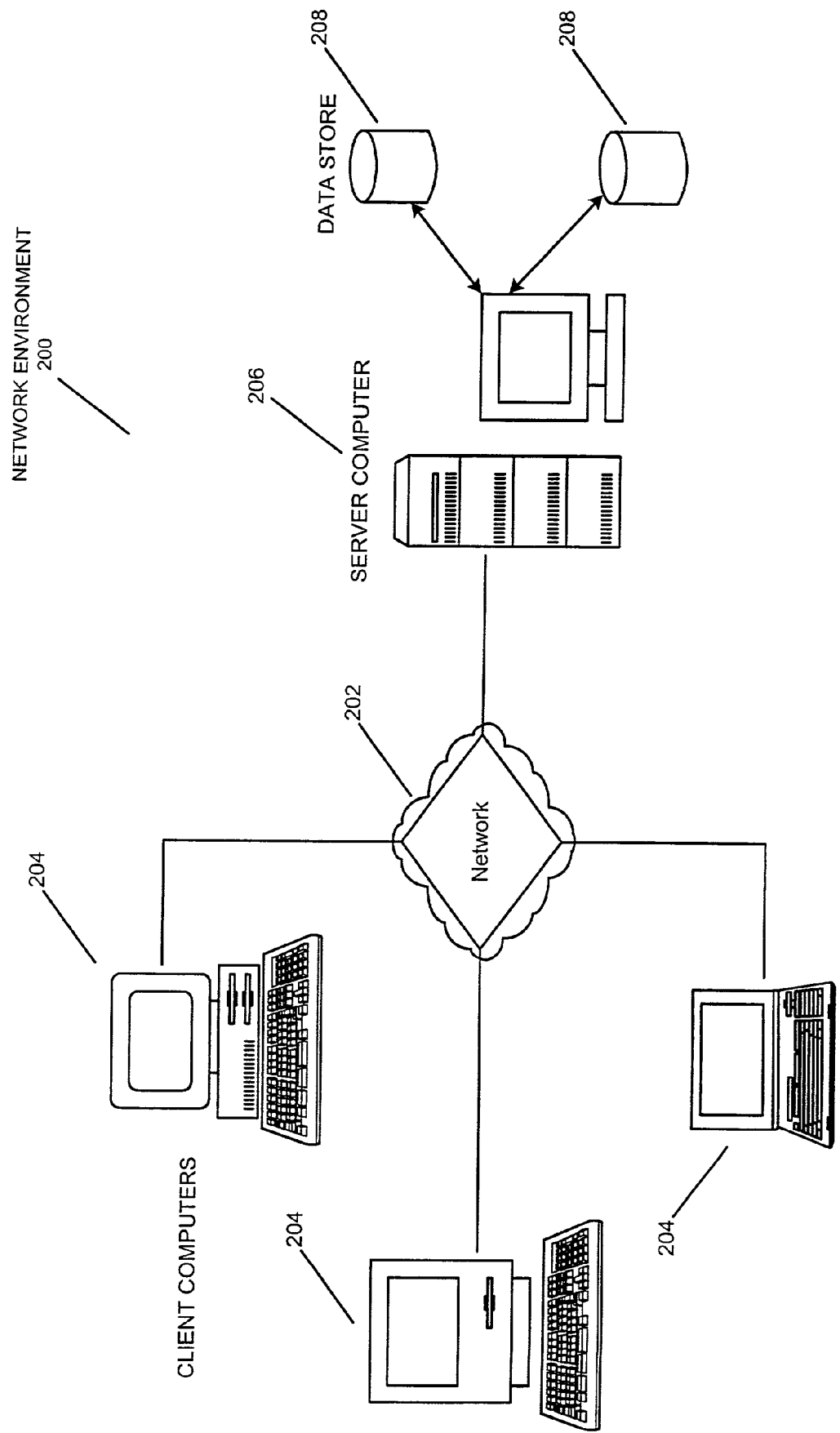
FIG. 2 schematically illustrates a network environment in which the processed video stream may be used for an embodiment of the present invention.

FIG. 2 schematically illustrates a network environment 200 in which a video file 130 processed by one embodiment of the present invention. In particular, FIG. 2 illustrates a typical distributed computer system 200 using a network 202 to connect client computers 204 executing client applications to a server computer 206 executing software and other computer programs, and to connect the server system 206 to data sources 208. A data source 208 may comprise, for example, a multi-media database storing video files in MPEG format with marked fields (e.g., a processed video file 130). These processed video file 130 may alternatively be stored at one or more of the client computers 204.

A typical combination of resources may include client computers 204 that are personal computers or workstations, and a server computer 206 that is a personal computer, workstation, minicomputer, or mainframe. These systems are coupled to one another by various networks, including LANs, WANs, SNA networks, and the Internet. Each client computer 204 and the server computer 206 additionally comprise an operating system and one or more computer programs. The server computer 206 also uses a data source interface and possibly, other computer programs, for connecting to the data sources 208. The client computer 204 is bi-directionally coupled with the server computer 206 over a line or via a wireless system. In turn, the server computer 206 is bi-directionally coupled with data sources 208.

An extraction tool may be a software program resident on a client computer 204 or a server computer 206 connected to a network 202. Those skilled in the art will recognize that the extraction tool may also be implemented on hardware or firmware. A client computer 204 typically executes a client application (e.g., a browser) and is coupled to a server computer 206 executing one or more server software programs. The extraction tool may then be directly invoked by a user or invoked by another application at the client computer 204. If the extraction tool were resident at the client computer 204, the extraction tool would access a processed video file 130 stored in a data source 208 via the server computer 206. Then, the extraction tool would use the marked fields 136 to extract frames representing scene changes for generating thumbnails.

In another embodiment, the server software may include the extraction tool. In this case, the extraction tool would access processed video file 130 stored in a data source 208 and create a storyboard. If the extraction tool were invoked by a user or application at the client computer 204, the extraction tool would transmit the storyboard to the client computer 204. Additionally, the server software may use the scene change data to generate an index of access points for displaying specific scenes or segments.

The operating system and computer programs are comprised of instructions which, when read and executed by the client and server computers 204 and 206, cause the client and server computers 204 and 206 to perform the steps necessary to implement and/or use the scene change marking system 126. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will also recognize that the exemplary environment 200 illustrated in FIG. 2 is not intended to limit the present invention. Indeed, those skilled in the art will recognize that other alternative hardware environments may be used without departing from the scope of the present invention. The manner in which the present scene change marking system 126 operates within both of the previously described environments 100 and 200 will be explained below in further detail.

Figure 3:
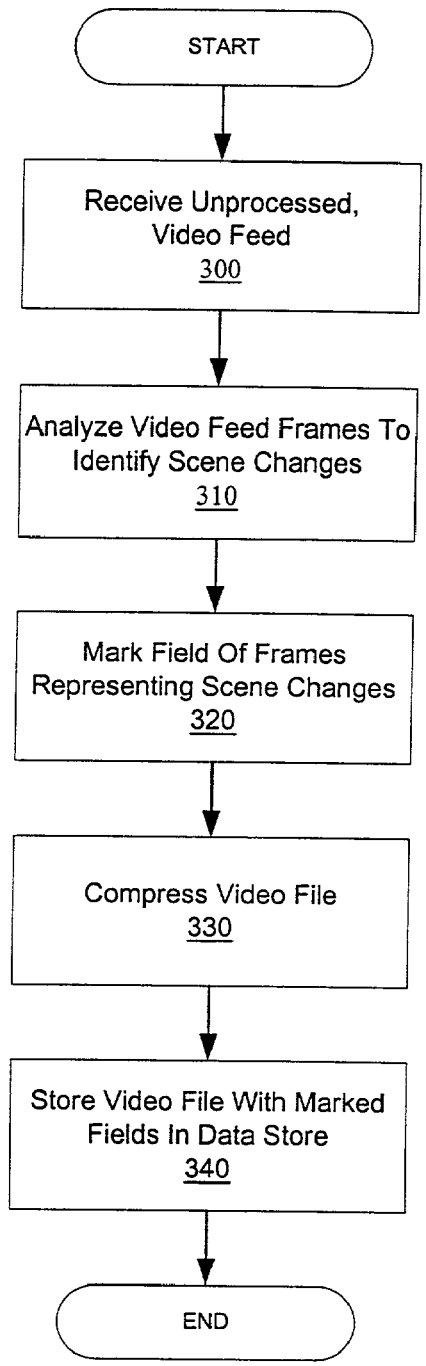
FIG. 3 is a flow diagram illustrating a process that uses the scene change marking system.

FIG. 3 is a flow diagram illustrating a scene change marking technique as implemented by the scene change marking system 126. In block 300, the unprocessed, video stream 110 is received by an encoder 120. If the unprocessed video stream 110 is in analog format, the encoder 120 converts the analog video stream 110 into a digital video stream.

In block 310, the encoder 120, with an internal 122 or external 124 scene change detection device, analyzes each frame of the motion-based video 110. The encoder 120 compares a first frame to a second frame, the second frame to a third frame, etc. for every frame within the video stream 110 to identify which frames represent scene changes. A scene change occurs when the content of a frame changes sufficiently compared to a previous frame to trigger a new view. A scene change normally occurs between two full frames 132. In alternative embodiments, a scene change may occur between a full frame 132 and a delta frame 134 or between two delta frames 134. Scenes that represent scene changes typically portray significant changes in the content of the video stream 110 whereas "non scene change" frames portray less significant details (e.g., details that are repeated from prior frames). These details may be extracted from previous frames and therefore do not need to be encoded, and will be filled in or smoothed out by the human eye. Thus, the encoder 120, with the scene change marking system 126, identifies scene changes in frames to determine which frames are "main" or "key" frames.

A scene change may be triggered by any number of changes within a scene. For example, a scene change may be based on a degree of change caused by a pan or a scan, a tilt, a zoom, a cut, and other changes. A pan or a scan involves moving a camera along a horizontal axis to follow action and to reveal the content of a scene to the audience. In other words, strips of a scene are deleted from one or both sides of a picture and a corresponding number of strips are added to the frame. Thus, when panning is done across a scene that is larger than the screen, most of the image does not change. A tilt, however, refers to moving a camera in a vertical motion. A zoom may "zoom in" from or "zoom out" from an object. When the magnification of the objects are increased, the viewer "zooms in" on the object. If the magnification of the objects decrease, the viewer "zooms out" from the object. In a zoom, the relative positions and sizes of all of the objects remain the same. A cut involves a change in either camera angle, placement, location, or time. In other words, a cut is an abrupt change into a new scene.

Further, scene change frames may be selected based on application specific criteria or criteria selected by a user. For example, an application or user may specifically need frames that represent scene changes based on a zoom of 150%. In this example, the scene change analysis will focus on zooms rather than other scene change attributes such as pans, scans or cuts. Thus, applications or users may specify any number and combination of scene change attributes to represent scene changes.

In addition, scene change analysis may be performed by automated devices. Automated devices may utilize techniques that perform complex calculations to analyze scene changes. A typical video stream 110 may include thousands or tens of thousands of frames. Thus, analyzing every frame of the video stream 110 can easily involve numerous complicated calculations. The calculations become even more complex if the internal or external scene detection device 122 or 124 is tuned to read and analyze finer changes within a scene. For example, computations may be more complex if a scene change is defined when an object moves an inch as compared to a foot or when an object is zoomed by 100% as compared to 200%.

Continuing with FIG. 3, in block 320, the user data fields 136 of scene change frames are updated by the scene change marking system 126. With reference to FIG. 1, an updated user data field 136 is represented as a dark box in the upper left corner of a frame (i.e., frames 1 and 4).

The user data field 136 may store various types of scene change data. For example, conventional systems utilize the user data field 136 to store closed captioning data. The amount of memory allocated to each user data field 136 depends on the complexity of the technique that identifies scene changes. Less space may be available for the user data field 136 if the scene change analysis involves more complex analysis.

In contrast to conventional systems, the scene change marking system 126, utilizes the user data field 136 to store scene change data. As previously explained, in an alternative embodiment, private data fields may also be used to store updated scene change data. Thus, when the encoder 120 identifies scene changes within the motion-based video 110 during its initial analysis of the video stream 110, the scene change marking system 126 updates the field 136 of each frame representing a scene change with appropriate scene change data concurrently with this initial analysis.

The marking of the frames to indicate a scene change must be done in a transparent manner for the encoded content. For example, in MPEG, optional "user data" can be held in each encoded video frame. The decoders will either utilize the data if they are programmed to do so, or they will discard it without impact to the rest of the decoding process. The scene change marking system implements this technique with a signal or user data start code of hex: 00 00 01 B2. The start code cannot contain 23 consecutive zeros. The first user data start code of hex is terminated by the next start code. One possible implementation of a user data field would be to have a word indicator signaling Scene_Change_Indicator and a word field indicating the type of scene change. For example, the type of scene change may be indicated such that 01=new, 02=pan, 03=scan., etc. A more complex example would add a percentage field that indicates the percentage of change in the scene, a direction field for overall motion changes, or an effects indicator to describe a standard transition effect.

The flexibility of the user data field configurations to signify scene changes presents a number of alternative embodiments for the structure of the user data field 136. For example, in an alternative embodiment, the user data field 136 is structured such that a single data bit indicates whether a scene change occurred, and thus, whether the corresponding frame should ultimately be selected.

In yet another alternative embodiment of the present invention, the data bits may indicate that a scene change occurred due to one or more specific scene change attributes. For example, four data bits may represent four different scene change attributes (e.g., bit 1 may represent a scan, bit 2 may represent a tilt, bit 3 may represent a zoom, and bit 4 may represent a cut). If a camera is tilted sufficiently such that a scene change occurs in a frame, bit 2 of the user data field 136 of that frame, corresponding to a tilt, may be updated to indicate that the frame represents a scene change. However, if the scene change was caused by a cut, bit 4 may be updated. Further, one skilled in the art will recognize that any number of data bits may identify scene changes caused by changes of specific scene change attributes.

In an additional alternative embodiment of the present invention, one or more additional data bits may be allocated within the user data field 136 to represent a quantify or amount of change caused by a corresponding scene change attribute. For example, additional data bits may indicate that a 25 degree tilt or a 150% zoom occurred within a frame. The encoder 120 or other scene detection device may then interpret these quantities and determine whether a scene change occurred. The corresponding data bits within the user data field 136 of that frame may be updated to indicate that a scene change occurred within that frame.

Those skilled in the art will recognize that the scope of the invention encompasses a user data field 136 that may utilize different data configurations to represent scene change data or to indicate that scene change occurred. Therefore, the previously described embodiments are not intended to limit the present invention.

Further, in additional embodiments of the present invention, within the encoder 120, the scene change marking system 126 may mark user data fields 136 of frames representing scene changes during or after the video file 130 is compressed as explained below.

Referring to FIG. 3, in block 330, the video file 130 is compressed into, for example, an MPEG file 130. The MPEG file 130 includes a fraction of the total number of full frames within the video stream 110. To illustrate scene changes with an example, a video stream 110 of a football game may include a full frame 132 with an image illustrating a person ready to throw the ball and the stadium background. The video stream 110 may also include full frames 132 representing changes from the initial full frame 132 illustrating the starting pose of throwing a ball. Each subsequent frame includes images of the quarterback's hand in slightly different positions as compared to the previous full frame 132 to emulate the arm moving forward to throw the ball. If the cameras are moved or switched to a different video of the quarterback and stadium, a scene change has occurred, and this change is signified in the user data field 136 of the corresponding frame.

As part of the compression process, the frames representing scene changes may be retained in the MPEG file 130 whereas other frames are deleted or not encoded. Thus, if the stadium background does not change, the background does not be illustrated in the delta frames 134 which represent only the changes between frames. In this scenario, the delta frames will not be encoded as part of the compression process performed by the encoder 120. However, as the frames progress and portray the person's arm moving forward further, a delta frame 134 may illustrate an image of the arm in different positions as the forward motion is completed such that a scene change has occurred. This frame may be included within the MPEG file 130. If this process is continued for the remaining frames portraying the quarterback throwing the ball, the series of full frames 132 and delta frames 134 displayed in quick succession creates an illusion of a quarterback throwing a football.

Since not all details can be captured and stored, there may be missing information in the video file. Because only some "important" details are selected, there are "gaps of detail" in the video file. In other words, the compressed frames portray the image of a quarterback throwing the ball and any discontinuities resulting from lost image content may be "smoothed out" or "filled in" by the human eye which still perceives an illusion of throwing a ball when the frames are viewed in succession. Smaller images of scene change frames, often termed "thumbnails," may also be generated to represent different portions of the video file 130 to create a storyboard.

The resulting MPEG file 130 may be compressed to as little as 1% of the original video stream file size. Eliminating this much data may be necessary because of limited transmission bandwidth, some of which is also consumed by related audio and sound files. Further, the smaller size file of video file 130 is desired to reduce the time required to download the file. This problem is amplified if slower modems or network connections are utilized. The resulting compressed video file 130 includes multiple frames in the same format (e.g., MPEG or Joint Photographic Experts Group (JPEG) format) which store changes from one frame to another instead of storing each entire frame of the original motion-based video 110. The frames storing changes between frames are delta frames 134 which are based on prior full frames 132. After the video stream is processed and a compressed video file 130 is generated, the video file, including the frames with marked user data fields 136 are stored to a data store 140 in block 340.

Figure 4:
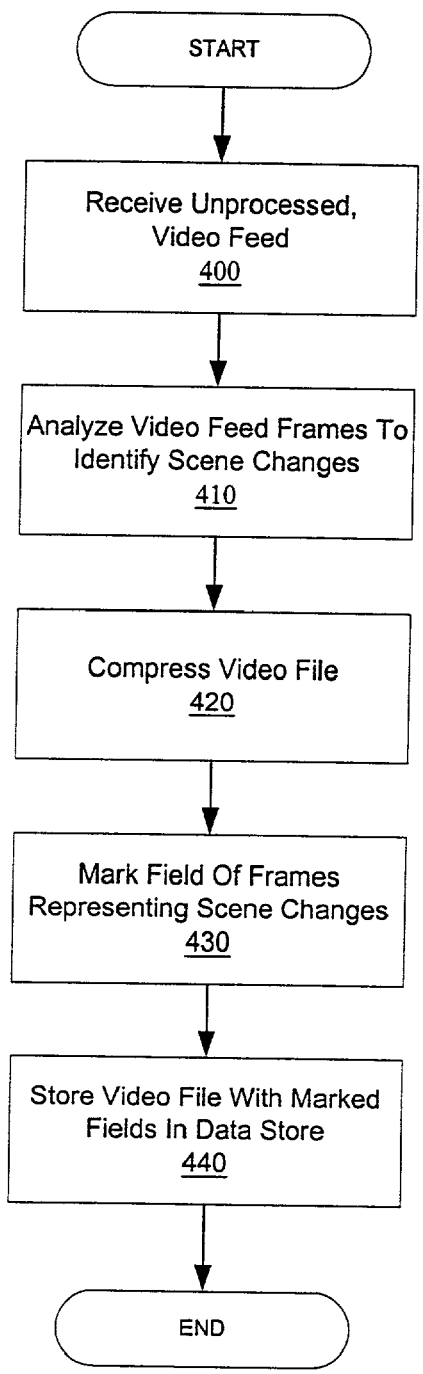
FIG. 4 is a flow diagram illustrating another process that uses the scene change marking system.

FIG. 4 is a flow diagram illustrating another process that uses the scene change marking system 126. In an alternative embodiment of the present invention, instead of using the technique illustrated in FIG. 3, the scene change marking system 126 can be utilized by performing block 400 in which an encoder 120 receives an unprocessed, video stream 110. Then, in block 410, the video stream 110 frames are analyzed to identify scene changes. In block 420, the video stream 110 is compressed. Continuing with block 430, user data fields 136 of frames representing scene changes are marked. Finally, in block 440, the video file 130 with the marked fields is stored in a data store 140.

Figure 5:
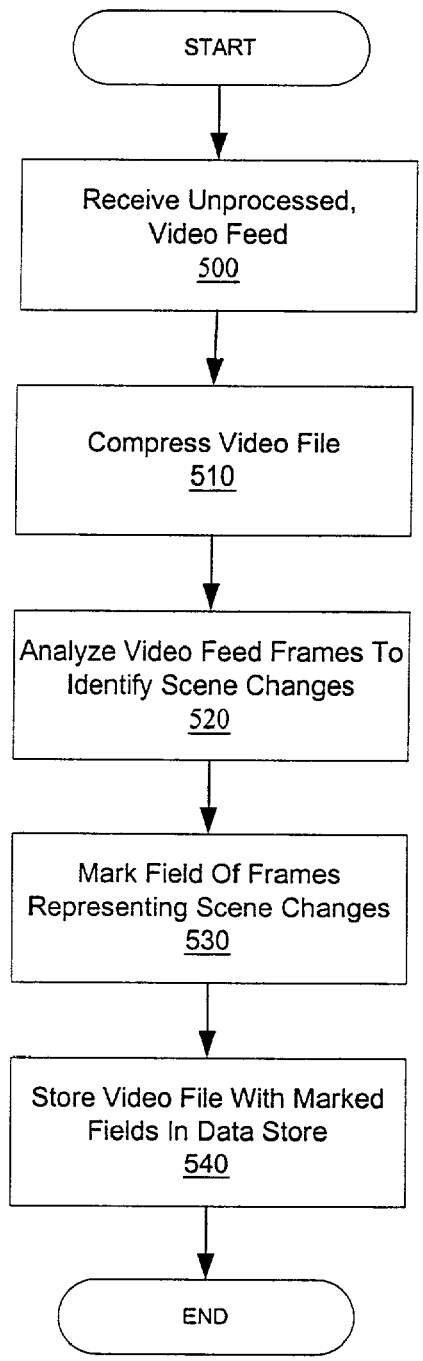
FIG. 5 is a flow diagram illustrating an additional process that uses the scene change marking system.

FIG. 5 is a flow diagram illustrating an additional process that uses the scene change marking system. In yet another alternative embodiment of the present invention, initially, in block 500, an unprocessed video stream 110 is received by an encoder 120. In block 510, the video stream 110 is compressed. Then, in block 520, the video stream 110 is analyzed to identify scene changes. In block 530, the fields 136 representing scene changes are marked. Finally, in block 540, the video file 130 containing the marked fields is stored in a data store 140.

Considering the possible techniques illustrated in FIGS. 3, 4, and 5, scene change analysis can be performed in either the compressed domain or the uncompressed domain while the field marking may occur in the compressed domain.

Figure 6:
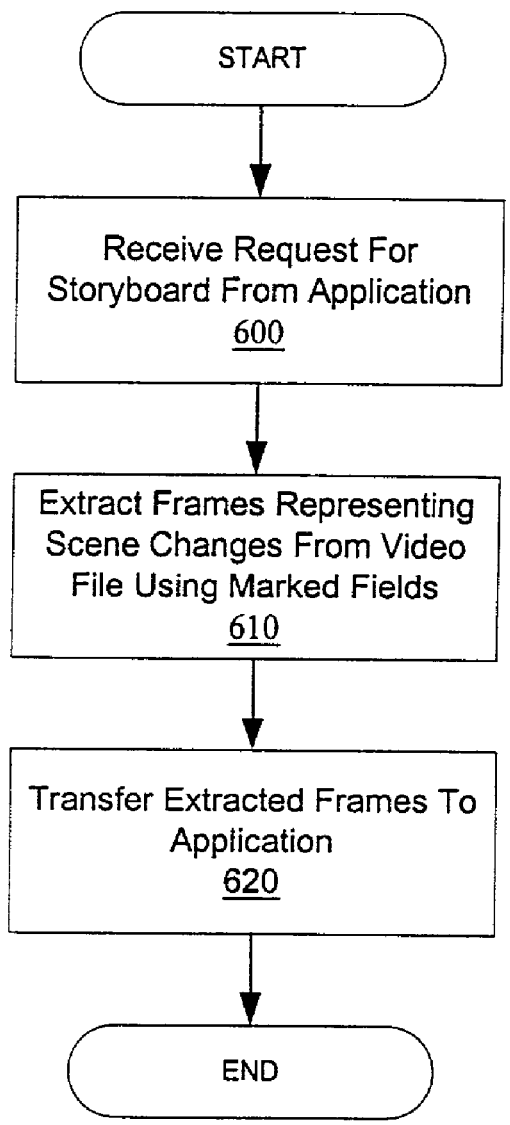
FIG. 6 is a flow diagram illustrating the use of a processed video file marked by the scene change marking system.

FIG. 6, a flow diagram illustrating one application of the present invention to generate a storyboard. In block 600, an extraction tool receives a request for thumbnails. The thumbnails must be retrieved from the marked video file 130 that is stored in a data store 140. The video file 130 includes both scene change frames and other frames. All of the frames may include user data fields 136, however, typically only some of the frames have user data fields 136 that were marked by the scene change marking system 126. The extraction tool is configured to read scene change data in the user data fields 136 of all of the frames of the video file 130 to determine which frames to select instead of repeating the scene change analysis as required in conventional systems.

By reading the user data fields 136 of each frame, i.e., reading the scene change data in real time or near real time, the extraction tool determines which user data fields 136 were marked, and thus, which frames represent scene changes. In block 610, the extraction tool extracts scene change frames from the video file 130. Thus, with the scene change marking system 126, the extraction tool is not required to repeat the scene change analysis to identify scene change frames. After the extraction tool selects the scene change frames, in block 620, the extraction tool transfers the scene change frames to the application.

Considering the forgoing description, the scene change marking system 126 overcomes the limitations in conventional systems caused by the inability to access scene change data in real-time or near real-time. First, the scene change marking system 126 eliminates or minimizes the time required to identify scene change frames by enabling an extraction tool or other application to read the user data fields 136 to identify scene change frames. As a result, it is not necessary to repeat the complicated scene change analysis.

The time saved by the scene change marking system 126 can be significant. For example, conventional extraction tools may require 10 minutes to process and analyze scene changes within a 40-50 minute video clip. By accessing scene change data in the user data fields 136 in real time, the scene change marking system 126 eliminates this delay which would otherwise be assumed by the user who requested the file 130.

Further, the time saved by not repeating the scene change analysis also benefits newsroom editors and producers who receive video streams 110 and are required to generate video files 130 of recent news events in a short period of time. These video files 130 may include numerous scene changes, and thus, scene change analysis may be a bottleneck to processing the video. The scene change marking system 126 eliminates this bottleneck by saving editors and producers critical processing and editing time that is otherwise lost by repeating the intensive scene change analysis. Rather, applications can be configured to read the user data fields 136 to identify scene change frames. In addition, since applications involving the Internet may process and download video files more slowly, more users may choose to use the Internet to download storyboard files since downloads may be completed in a shorter period of time. Therefore, an extraction tool with real time access to scene change data can enhance numerous different applications involving video feeds, whether those applications relate to news publications, video editing, Internet, or other applications.

A further advantage of the scene change marking system 126 over conventional systems is that the scene change marking system 126 reduces costs of generating video files 130. Producers and editors generate video clips more efficiently thereby reducing the processing and production costs since the scene change data can be accessed in real time or near real time. Editing tasks that may have previously required hours may be completed within a matter of minutes, and thus, editing and processing costs are significantly reduced.

Moreover, the scene change marking system 126 is advantageous since the quality and accuracy of the resulting video file 130 will be enhanced. Conventional systems analyze the original video feed at the encoder, and then repeat the analysis on the video feed or video files which output by the encoder, i.e., on data that was previously processed. As a result, the resulting video file may omit original movie data. The scene change marking system 126 overcomes this shortcoming by analyzing scene changes only one time rather than repeating the scene change analysis on data that was previously processed. As a result, the scene change marking system 126 generates a more accurate, higher quality video file 130 with improved resolution.

CONCLUSION

This concludes the description of an embodiment of the invention. The following describes some alternative embodiments for accomplishing the present invention. For example, any type of computer, such as a mainframe, minicomputer, or personal computer, or computer configuration, such as a time-sharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a video stream received by a computer, the method comprising:
receiving a video stream, wherein the video stream comprises multiple frames;
analyzing the video stream to identify scene changes between frames of the video stream; and
updating one or more user or private data fields of one or more scene-change frames of the video stream to indicate that a scene change occurs in the scene-change frame and to indicate the scene change's type, in a manner transparent for encoded content within the frames.

2. The method of claim 1, wherein the computer comprises an encoder.

3. The method of claim 2, wherein the user or private data fields are updated within the encoder.

4. The method of claim 1, wherein the scene change occurs when the content of a first frame of the video stream changes sufficiently in a second frame of the video stream such that the second frame triggers a new view relative to the first frame.

5. The method of claim 1, wherein the scene change's type indicates that the scene change in the scene-change frame occurred due to one or more specific scene change attributes.

6. The method of claim 5, wherein the scene change attributes identify that the scene change occurred due to a scan, tilt, zoom or cut.

7. The method of claim 6, further comprising updating the user or private data fields of the scene-change frames with one or more additional data bits that represent an amount of change caused by the scene change.

8. The method of claim 1, further comprising compressing the video stream to generate a video file.

9. The method of claim 8, wherein a frame of the video file representing a scene change comprises a full frame.

10. The method of claim 8, wherein a frame of the video file representing a scene change comprises a delta frame.

11. The method of claim 8, further comprising extracting one of more frames representing a scene change from the video file with an extraction tool, wherein the extraction tool selects frames representing scene changes by reading scene change data in the fields.

12. The method of claim 11, wherein the extraction tool accesses the scene change data in the fields in real time.

13. The method of claim 11, further comprising generating a storyboard with the extracted frames.

14. The method of claim 1, further comprising updating the user or private data fields of the scene-change frames with a percentage field that indicates a percentage of scene change in the scene-change frames.

15. The method of claim 1, further comprising updating the user or private data fields of the scene-change frames with a direction field for motion changes in the scene-change frames.

16. The method of claim 1, further comprising updating the user or private data fields of the scene-change frames with an effects indicator that describes a transition effect in the scene-change frames.

17. The method of claim 1, wherein the user or private data fields of the scene-change frames that indicate the scene change occurs in the scene-change frame are processed in order to provide an index of access points for displaying specific scenes or segments.

18. An apparatus for processing a video stream, comprising:
a computer; and
one or more computer programs, performed by the computer, for receiving a video stream, wherein the video stream comprises multiple frames; analyzing the video stream to identify scene changes between frames of the video stream; and updating one or more user or private data fields of one or more scene-change frames of the video stream to indicate that a scene change occurs in the scene-change frame and to indicate the scene change's type, in a manner transparent for encoded content within the frames.

19. The apparatus of claim 18, wherein the computer comprises an encoder.

20. The apparatus of claim 19, wherein the user or private data fields are updated within the encoder.

21. The apparatus of claim 18, wherein the scene change occurs when the content of a first frame of the video stream changes sufficiently in a second frame of the video stream such that the second frame triggers a new view relative to the first frame.

22. The apparatus of claim 18, wherein the scene change's type indicates that the scene change in the scene-change frame occurred due to one or more specific scene change attributes.

23. The apparatus of claim 22, wherein the scene change attributes identify that the scene change occurred due to a scan, tilt, zoom or cut.

24. The apparatus of claim 23, further comprising updating the user or private data fields of the scene-change frames with one or more additional data bits that represent an amount of change caused by the scene change.

25. The apparatus of claim 18, further comprising compressing the video stream to generate a video file.

26. The apparatus of claim 25, wherein a frame of the video file representing a scene change comprises a full frame.

27. The apparatus of claim 25, wherein a frame of the video file representing a scene change comprises a delta frame.

28. The apparatus of claim 25, further comprising extracting one of more frames representing a scene change from the video file with an extraction tool, wherein the extraction tool selects frames representing scene changes by reading scene change data in the fields.

29. The apparatus of claim 28, wherein the extraction tool accesses the scene change data in the fields in real time.

30. The apparatus of claim 28, further comprising generating a storyboard with the extracted frames.

31. The apparatus of claim 18, further comprising updating the user or private data fields of the scene-change frames with a percentage field that indicates a percentage of scene change in the scene-change frames.

32. The apparatus of claim 18, further comprising updating the user or private data fields of the scene-change frames with a direction field for motion changes in the scene-change frames.

33. The apparatus of claim 18, further comprising updating the user or private data fields of the scene-change frames with an effects indicator that describes a transition effect in the scene-change frames.

34. The apparatus of claim 18, wherein the user or private data fields of the scene-change frames that indicate the scene change occurs in the scene-change frame are processed in order to provide an index of access points for displaying specific scenes or segments.

35. An article of manufacture comprising a computer program storage device readable by a computer for storing one or more instructions that, when executed by the computer, causes the computer to perform method steps for processing a video stream in the computer, the method comprising:

receiving a video stream, wherein the video stream comprises multiple frames;

analyzing the video stream to identify scene changes between frames of the video stream; and updating one or more user or private data fields of one or more scene-change frames of the video stream to indicate that a scene change occurs in the scene-change frame and to indicate the scene change's type, in a manner transparent for encoded content within the frames.

36. The article of manufacture of claim 35, wherein the computer comprises an encoder.

37. The article of manufacture of claim 35, wherein the user or private data fields are updated within the encoder.

38. The article of manufacture of claim 35, wherein the scene change occurs when the content of a first frame of the video stream changes sufficiently in a second frame of the video stream such that the second frame triggers a new view relative to the first frame.

39. The article of manufacture of claim 35, wherein the scene change's type indicates that the scene change in the scene-change frame occurred due to one or more specific scene change attributes.

40. The article of manufacture of claim 39, wherein the scene change attributes identify that the scene change occurred due to a scan, tilt, zoom or cut.

41. The article of manufacture of claim 40, further comprising updating the user or private data fields of the scene-change frames with one or more additional data bits that represent an amount change caused by the scene change.

42. The article of manufacture of claim 35, further comprising compressing the video stream to generate a video file.

43. The article of manufacture of claim 42, wherein a frame of the video file representing a scene change comprises a full frame.

44. The article of manufacture of claim 42, wherein a frame of the video file representing a scene change comprises a delta frame.

45. The article of manufacture of claim 42, further comprising extracting one of more frames representing a scene change from the video file with an extraction tool, wherein the extraction tool selects frames representing scene changes by reading scene change data in the fields.

46. The article of manufacture of claim 45, wherein the extraction tool accesses the scene change data in the fields in real time.

47. The article of manufacture of claim 45, further comprising generating a storyboard with the extracted frames.

48. The article of manufacture of claim 35, further comprising updating the user or private data fields of the scene-change frames with a percentage field that indicates a percentage of scene change in the scene-change frames.

49. The article of manufacture of claim 35, further comprising updating the user or private data fields of the scene-change frames with a direction field for motion changes in the scene-change frames.

50. The article of manufacture of claim 35, further comprising updating the user or private data fields of the scene-change frames with an effects indicator that describes a transition effect in the scene-change frames.

51. The article of manufacture of claim 35, wherein the user or private data fields of the scene-change frames that indicate the scene change occurs in the scene-change frame are processed in order to provide an index of access points for displaying specific scenes or segments.

* * * * *